(12) United States Patent
O'Neill

(10) Patent No.: US 9,128,109 B1
(45) Date of Patent: Sep. 8, 2015

(54) METHOD AND SYSTEM FOR DETECTING ERRORS IN INDICATED AIR SPEED

(75) Inventor: Kenneth Robert O'Neill, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 372 days.

(21) Appl. No.: 13/589,568

(22) Filed: Aug. 20, 2012

(51) Int. Cl.
G01P 5/00 (2006.01)

(52) U.S. Cl.
CPC .......................................... G01P 5/00 (2013.01)

(58) Field of Classification Search
CPC ............................................................ G01P 5/00
See application file for complete search history.

(56) References Cited

U.S. PATENT DOCUMENTS

| | | | | |
|---|---|---|---|---|
| 2,938,280 A * | 5/1960 | Hunt | ............................... | 434/49 |
| 3,004,352 A * | 10/1961 | Crabb | ............................ | 434/49 |
| 3,182,498 A * | 5/1965 | Koletsky et al. | ............ | 73/178 T |
| 3,486,722 A * | 12/1969 | Greene | ......................... | 244/188 |
| 3,686,936 A * | 8/1972 | Daudt, Jr. | ....................... | 73/180 |
| 3,693,872 A * | 9/1972 | Titus | ........................... | 235/78 N |
| 3,863,204 A * | 1/1975 | Hoekstra | ....................... | 340/959 |
| 4,130,015 A * | 12/1978 | Grover | ........................ | 73/178 T |
| 4,284,029 A * | 8/1981 | Roberts | ........................ | 116/300 |
| 4,319,333 A * | 3/1982 | Hedrick | ........................ | 702/144 |
| 4,773,015 A * | 9/1988 | Leland et al. | ................... | 701/15 |
| 5,105,191 A * | 4/1992 | Keedy | ............................. | 340/968 |
| 5,349,347 A * | 9/1994 | Muller | ........................... | 340/969 |
| 6,205,376 B1 * | 3/2001 | Gordon | ............................ | 701/4 |
| 6,298,286 B1 * | 10/2001 | Ying | ................................ | 701/4 |
| 6,449,573 B1 * | 9/2002 | Amos | ............................ | 702/98 |
| 6,473,676 B2 * | 10/2002 | Katz et al. | ......................... | 701/4 |
| 7,664,601 B2 * | 2/2010 | Daly, Jr. | ............................ | 702/3 |
| 7,999,926 B2 * | 8/2011 | Perrie et al. | ..................... | 356/28 |
| 8,352,187 B2 * | 1/2013 | Perrie et al. | ....................... | 702/3 |
| 8,412,389 B2 * | 4/2013 | Tessier | ............................. | 701/3 |
| 8,552,888 B2 * | 10/2013 | Perrie et al. | .................. | 340/978 |
| 8,606,437 B2 * | 12/2013 | Caldeira et al. | ................. | 701/16 |
| 2006/0212182 A1 * | 9/2006 | Shaw | ............................... | 701/12 |
| 2007/0065289 A1 * | 3/2007 | Greene | ..................... | 416/223 R |
| 2010/0100260 A1 * | 4/2010 | McIntyre et al. | ................. | 701/6 |
| 2011/0040430 A1 * | 2/2011 | Tessier | ............................. | 701/3 |
| 2011/0184592 A1 * | 7/2011 | Elias et al. | ........................ | 701/7 |

(Continued)

OTHER PUBLICATIONS

737 Quick Reference Handbook, Sep. 24, 2007, Boeing, D6-27370-8AS-RYR(AS).*

(Continued)

*Primary Examiner* — Helal A Algahaim
*Assistant Examiner* — Kelly D Williams
(74) *Attorney, Agent, or Firm* — Mark Pelligrini

(57) ABSTRACT

A method and system for detecting errors in indicated air speed of an aircraft. The method may include receiving current measured data values indicative of one or more of a pressure altitude, vertical speed, pitch attitude, and engine power of the aircraft by a computer, accessing a table having values of indicated air speed (IAS) corresponding to the current measured data values, and computing from the table and the current measured data values a current expected IAS, receiving current data values indicative of measured IAS of the aircraft, comparing the expected IAS data values to the measured IAS data values, and generating an alert signal when the expected IAS data values and measured IAS data values differ by a pre-set amount. The computer may include a software module that utilizes output from pre-existing on-board sensors, and may generate a signal to a crew alerting system.

21 Claims, 3 Drawing Sheets

(56) References Cited

U.S. PATENT DOCUMENTS

2012/0118076 A1* 5/2012 Foster .................... 73/861.65
2012/0180581 A1* 7/2012 Foster .................... 73/865.6
2012/0299753 A1* 11/2012 Thoreen .................. 340/975
2013/0204470 A1* 8/2013 Luckner et al. ........... 701/18

OTHER PUBLICATIONS

"737 Flight Crew Operations Manual—737 Quick Reference Handbook," by The Boeing Company, PI-QRH.10.1 to PI-QRH.10.2 (copyright 1999-2012).

* cited by examiner

METHOD AND SYSTEM FOR DETECTING
ERRORS IN INDICATED AIR SPEED

BACKGROUND

The present disclosure is directed to systems and methods for detecting unsafe flying conditions, and more particularly, systems and methods for detecting erroneous air speed indication.

Loss of control is recognized as a leading cause of commercial aircraft accidents, and in particular, commercial jet aircraft accidents. Air speed is a critical parameter in maintaining controlled flight, and the loss of the ability to receive accurate air speed measurements is a frequent cause of accidents resulting from aircraft traveling at air speeds that are above or below a desired range.

Aircraft typically measure air speed using a sensor that includes a pitot tube. Air speed measurements utilizing a pitot tube may become erroneous as a result of icing of the pitot tube opening, sensor port clogging due to volcanic ash, and bird strikes on air data sensors. Other failures that may give rise to erroneous air speed indication may include hardware failures, such as radome collapse, air data computer or air data transducer failures, and maintenance issues such as pneumatic line leaks or pitot probe covers not being removed by maintenance crew.

Regardless of the cause, when such unreliable air speed readings occur, it is incumbent upon the flight crew to recognize the condition in order to maintain a condition of continued safe flight and landing (CSFL). However, detection of erroneous air speed indication is not a straightforward task. Aircraft manufacturers have produced flight manuals that list up to twenty flight deck effects that might indicate unreliable air speed readings. It is therefore necessary for the flight crew to remember the indications that are connected with an unreliable air speed condition.

Currently, on commercial aircraft, the flight crew must recognize an unreliable air speed situation based upon the training of the members of the flight crew, prior experience, and information available in flight manuals for the aircraft in question. One such manual is a quick reference manual that may include a table containing data specific to a particular aircraft model. However, flight crews are trained to refer to such data tables only after they have detected conditions that they suspect indicate that the air speed readings may be inaccurate. Accordingly, there is a need for a method and system that may detect possible erroneous air speed indication data and alert a flight crew without the flight crew having to monitor data.

SUMMARY

This disclosure describes a method and system for detecting errors in indicated air speed. In one embodiment, a method for detecting errors in indicated air speed of an aircraft may include receiving current measured data values indicative of one or more of a pressure altitude, vertical speed, pitch attitude, and engine power of the aircraft by a computer. The computer may access a look-up table stored on a computer-readable storage medium. The look-up table may have values of indicated air speed (IAS) corresponding to the current measured data values, and the computer may compute from the look-up table and the current measured data values a current expected IAS.

The computer also may receive current data values indicative of measured IAS of the aircraft and compare the expected IAS data values to the measured IAS data values. In the event that the expected IAS data values and the measured IAS data values differ by a pre-set amount, the computer may generate an alert signal to the flight crew.

In other embodiments, the computer may receive data indicative of current flap and landing gear configuration. Such data may indicate a flight mode of the aircraft, namely, that the aircraft is in, for example, a final approach mode of flight.

In other embodiments, the computer may access one of a plurality of look-up tables, each corresponding to a different flight mode. Flight modes may include cruise, holding, climb, descent, terminal area, and final approach modes of aircraft flight.

The disclosed system for implementing the method may utilize many components currently present on an aircraft. In one embodiment, a software module running on an on-board computer may be configured to receive current measured data values indicative of one or more of a pressure altitude, vertical speed, pitch attitude, and engine power of the aircraft. The software module may access a computer-readable storage medium having a look-up table. The look-up table may include values of IAS corresponding to the current measured data values. The software module may be configured to compute from the look-up table and the current measured data values a current expected IAS.

The software module may be configured to receive current data values indicative of measured IAS of the aircraft, compare the expected IAS data values to the measured IAS data values, and generate an alert signal in the event that the expected IAS data values and the measured IAS data values differ by a pre-set amount. In an embodiment, the system may receive data from an existing air data computer (ADC) output that receives signals from on-board sensors indicative of pressure altitude, GPS (global positioning satellite) altitude and vertical speed.

In an embodiment, the software module may include filters for removing spurious altitude readings from the data received from the ADC. Similarly, in an embodiment, the software module may include a steady-state filter that smoothes out transients in data indicative of vertical speed received from the ADC. This may enable the software module to determine steady-state climb or descent rate.

In an embodiment, the system may include inputs from an initial reference unit indicative of pitch attitude, and an input from an existing engine controller output. The engine controller output may be a measure of engine power and may be derived from fan rotation speed or engine pressure ratio, depending upon engine type.

In an embodiment, the look-up table may have data from an existing quick reference handbook table for the particular aircraft model in question. In an embodiment, the output of the software module may be an IAS for an instantaneous condition of the aircraft. Such output may be smoothed to avoid transient jumps that might otherwise trigger spurious alerts. The computer software module may be configured to compare the measured IAS from the existing ADC output and compare that value to the expected IAS determined from the input parameters and look-up table.

In an embodiment, the software module may include a tolerance region that may be both magnitude- and time-based. That is, when the difference between the expected and measured IAS is greater than a pre-set or predetermined magnitude for a pre-set or predetermined time period, the software module may be configured to declare that the two values disagree and generate an alarm signal.

Other objects and advantages of the disclosed method and system will be apparent from the following description, the accompanying drawings and the appended claims.

DETAILED DESCRIPTION

Figure 1:
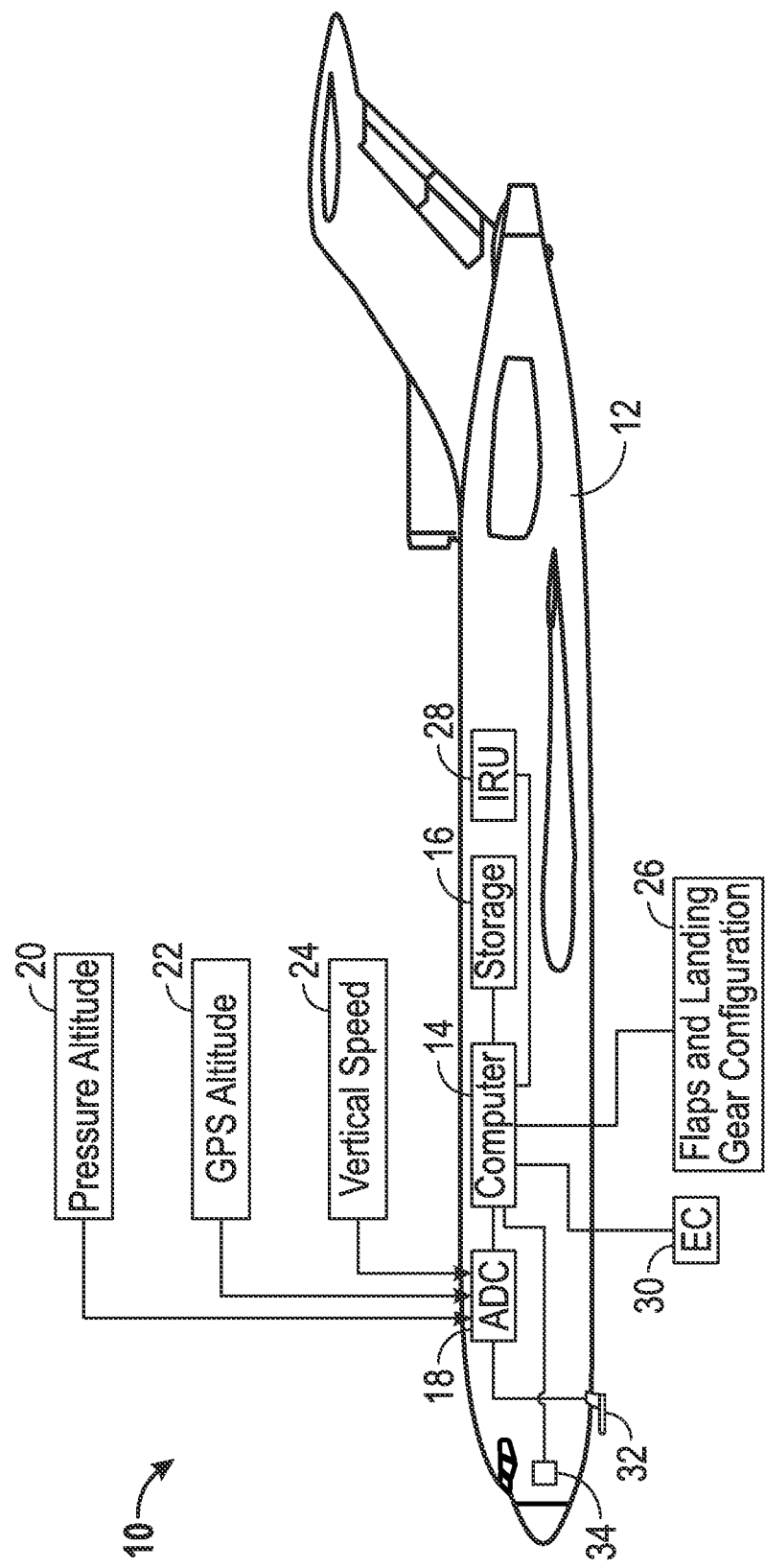
FIG. 1 is a schematic representation of the disclosed system for detecting errors in indicated air speed, shown embodied in an aircraft.

As shown in FIG. 1, the system for detecting errors in indicated air speed, generally designated 10, may be mounted in an aircraft, generally designated 12. The system 10 may include a computer 14 that interfaces with a computer-readable storage medium 16 that may be separate from the computer or integral therewith. In an embodiment, the computer 14 and/or storage medium may be located remotely from the aircraft 12, in which case the element 14 may represent a transponder or other communication device. The computer 14 may run a software module that executes the method shown in FIGS. 2 and 3.

The computer may be connected to an air data computer (ADC) 18. The air data computer 18 may receive inputs from sensors mounted on the aircraft indicative of one or more flight conditions, which may include a pressure altitude sensor 20, GPS altitude sensor 22, and vertical speed sensor 24. It is within the scope of the disclosure to provide a system 10 in which the computer 14 is integral with the ADC 18.

The computer 14 also may receive data indicative of the configuration of the flaps and landing gear of the aircraft 12 from sensors 26 on the aircraft. Similarly, the computer may receive data indicative of the pitch attitude from an existing inertial reference unit 28 on the aircraft 12. The computer 14 also may receive data indicative of engine power from an engine controller 30 on the aircraft 12. In an embodiment, the data may be indicative of fan rotation speed or engine pressure ratio, depending on the engine type.

Measured indicated air speed (IAS) is inputted from a sensor 32, which in some embodiments may incorporate a pitot tube. The sensor 32 may transmit a signal to the ADC 18 indicative of a measured air speed of the aircraft 12, and from the ADC to the computer 14.

The computer may be connected to generate an alarm signal to a crew alerting system 34. The crew alerting system 34 may be a display in the cockpit, a messaging system or an audio alarm or message, or a combination of the foregoing.

The computer 14 may include a software module configured to receive an input stream of current measured data values from the ADC 18, engine controller 30, flaps and landing gear configuration sensor 26, and inertial reference unit 28. The software module of the computer 14 also may receive measured IAS from sensor 32, either directly, or as shown in FIG. 2, from ADC 18.

Figure 2:
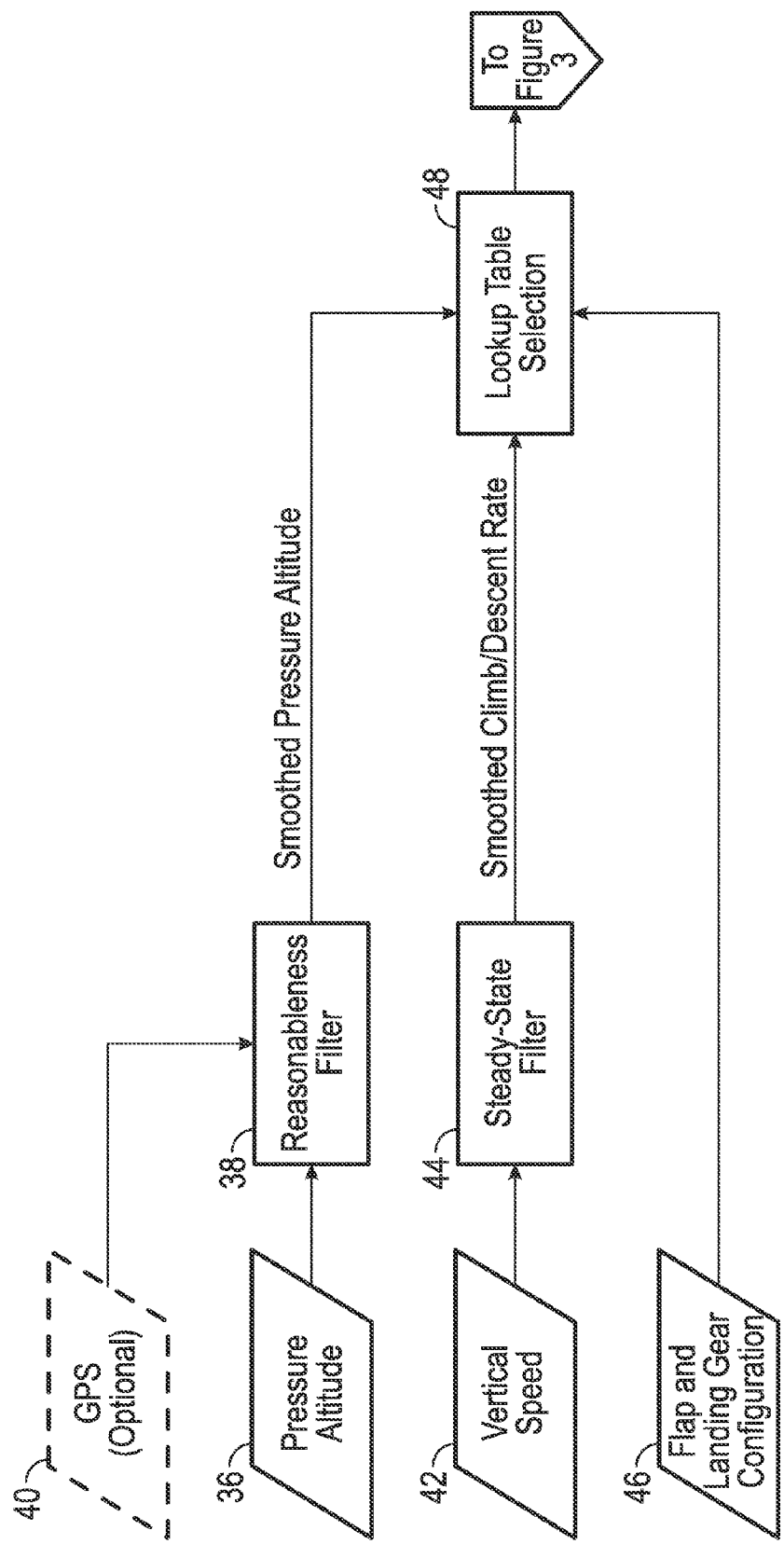
FIG. 2 is a flow chart of the disclosed method for detecting errors in indicated air speed.
Figure 3:
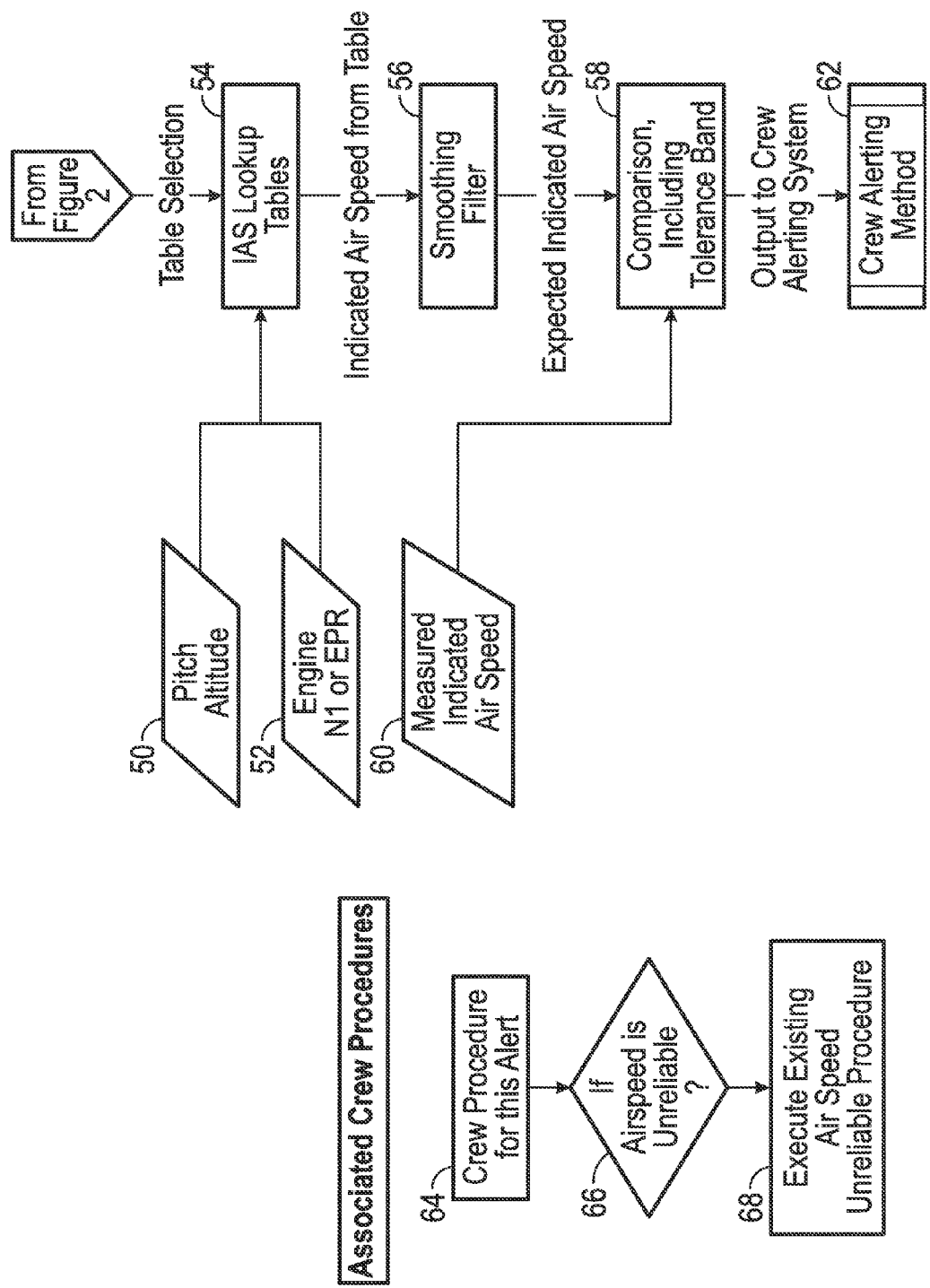
FIG. 3 is a continuation of the flow chart of FIG. 2.

The computer software module processes this data in an algorithm depicted in FIGS. 2 and 3. As shown in FIG. 2, the software module may receive an input of pressure altitude from the output of the ADC 18 (FIG. 1), as shown in block 36. As shown in block 38, the software module may apply a reasonableness filter that is used to remove spurious altitude readings from the input stream. This is necessary because some air data sensor failures may result in erroneous readings not only in air speed, but also pressure altitude. In addition, there may be short-duration spikes or transients that should be removed from this input.

The filter will use at least time history of pressure altitude readings to remove spurious data. In some embodiments, a more complex filter may be employed. For example, it may be desirable to use other input sources, such as a global positioning satellite (GPS) altitude sensor, indicated in block 40 to provide a reasonableness check. It should be noted that the filtering process indicated at block 38 may result in a delay in input data. Accordingly, a filter must be selected and designed based upon observed performance of the aircraft 12 (FIG. 1) and achieve a balance between a sufficiently high error rejection rate and the resultant delay in transmitting input data from the pressure altitude sensor 20 (FIG. 1).

As shown in block 42, the software module may receive an input of vertical speed from the existing ADC output. This value may be fed into a filter, indicated at block 44, that smoothes out transients to determine steady-state climb or descent rate of the aircraft 12 (FIG. 1). Climb or descent rate may be an output from tables stored in the storage medium 16 (FIG. 1). The filtering step indicated at block 44 (FIG. 2) may need to be adjusted as it may introduce an undesirable delay that should be balanced against the desired error rejection.

As indicated in block 46, the software module may receive measured input from the sensor 26 indicative of the configuration of the flaps and landing gear. As indicated in block 48, the software module may access the data table stored in storage medium 16 (FIG. 1), which may be in the form of a table. Such tables may be adapted from the quick reference handbook (QRH) developed for that particular aircraft 12 (FIG. 1). For example, there may be six different tables in the QRH that may be accessed by the software module: cruise, holding, climb, descent, terminal area, and final approach.

The tables for cruise mode may be selected on the data indicating that the climb/descent rate is very small, below a pre-set value, which may indicate level flight, and data indicative of pressure altitude above a pre-set value. The table for the holding mode may be selected during level flight when altitude is below a pre-set limit for value. Tables for climb and descent may be selected based upon the climb/descent rate data input indicated at block 44. The table for the terminal area mode may be selected based upon level flight (climb/descent rate below a pre-set value) and landing gear and flap configuration information received from block 46 indicating that the landing gear and flap configuration are configured for landing. The table for final approach mode may be selected based upon landing gear and flap configuration indicating deployed landing gear and flaps configured for landing. The output of the software module at block 48 thus may depend upon the table selected.

As shown in FIG. 3, the software module may receive an input of data indicative of pitch attitude from inertial reference unit 28 (FIG. 1) indicated at block 50. As indicated at block 52, the software module also may receive input from an existing engine controller output. Such output may be a measure of engine power and may be proportional to fan rotation speed (N1), or engine pressure ratio (EPR), depending on the type of engine. As indicated at block 54, the software module may then access the look-up tables selected in the process step indicated at block 48 (FIG. 2), and in an embodiment, may employ an interpolation algorithm that may compute expected IAS given the input conditions and the selected table. Again, the accessed tables represented in block 54 may be constructed from existing QRH tables for the particular model aircraft 12 (FIG. 1). In an embodiment, increased precision may be obtained by deriving higher precision tables from known aircraft performance data.

The output of the software module at block 54 is an instantaneous expected IAS condition. This output may be smoothed, as indicated in block 56, by applying a smoothing filter, in order to avoid transient jumps that may otherwise trigger spurious alerts. After applying the smoothing filter indicated at block 56, the software module arrives at a value for the expected IAS, which is input to block 58. At this stage, the software module compares the instantaneous expected IAS to the measured IAS inputted from a sensor 32 (FIG. 1), such as a pitot tube, indicated at block 60. As shown in FIG. 1, this data may be received from an output of an existing ADC 18.

The step indicated at block 58 may include a tolerance region that may be both magnitude and time based. That is, when the difference between expected and measured IAS is greater than a specific magnitude for a specific time period, the software module, as indicated in block 58, may determine that the two values disagree. In the event that the values disagree, the module may send a signal to the crew alert system, as indicated in block 62. This alert method may include sending an alert message to a display 34 (FIG. 1), generate an audio alert such as an alarm, employ a messaging system, or a combination of the foregoing.

As indicated at block 64, the flight crew must follow a procedure in the event that an alarm or alert is generated in block 62. This procedure may include a checklist of steps to be performed by the flight crew, the alert may include a statement of the condition that caused the alert to be generated. As indicated in block 66, the flight crew may have discretion to determine whether the measured IAS is unreliable, and if so, the checklist may direct them to an existing air speed unreliable procedure, as indicated in block 68.

In an embodiment, the computer 14 may employ this procedure constantly during flight, and may employ it as frequently as once per second. In one aspect, this procedure stands in sharp contrast to pre-existing solutions in which flight crews may be required to check specifically for conditions that may indicate an unreliable measured IAS throughout a flight. The automated detection algorithm described herein may run continuously to perform checks more quickly, more often and with higher precision than currently possible with manual consultation of a QRH by flight crew members. Implementation of this method and system may increase the likelihood that an unreliable measured IAS event is recognized, and consequently, reduce the time to recognize it.

Another advantage of the method and system described herein is that it may be easily retrofitted onto existing aircraft. The software module described herein may be less complex than in other automated solutions, requiring less computational throughput and memory. Further, there are fewer measured parameter inputs required to arrive at a decision on whether or not an unreliable measured IAS condition exists. Further, the disclosed method and system utilize existing avionics components of an aircraft; no specialized equipment or sensors may be required.

While the forms of apparatus and methods herein described constitute preferred embodiments of this invention, it is to be understood that the invention is not limited to these precise forms of apparatus and methods, and that changes may be made therein without departing from the scope of the invention.

What is claimed is:

1. A method for detecting errors in indicated air speed of an aircraft, the method comprising:

receiving from sensors mounted on the aircraft current measured data values indicative of a pressure altitude, vertical speed, pitch attitude, and engine power of the aircraft by a computer;

accessing a plurality of look-up tables stored on a computer-readable storage medium, the look-up tables having values of indicated air speed (IAS) corresponding to each of the current measured data values, and computing from the look-up tables and the current measured data values a current expected IAS given the current measured data values and the values of IAS from the plurality of look-up tables;

receiving from an IAS sensor on the aircraft current data values indicative of a measured IAS of the aircraft by the computer;

comparing the current expected IAS data values to the current data values indicative of the measured IAS by the computer; and generating an alert signal when the computer determines that the current expected IAS data values and the current data values indicative of the measured IAS data values differ by a pre-set amount for a pre-set time period.

2. The method of claim 1, further comprising receiving data indicative of current flap and landing gear configuration by the computer.

3. The method of claim 1, further comprising determining a mode of aircraft flight.

4. The method of claim 3, further comprising selecting the look-up table from among a plurality of look-up tables stored on the computer-readable storage medium, each of the plurality of look-up tables corresponding to a different mode of aircraft flight, the selected look-up table being appropriate for a current mode of aircraft flight.

5. The method of claim 4, wherein each of the plurality of look-up tables corresponds to a different one of cruise, holding, climb, descent, terminal area, and final approach modes of aircraft flight.

6. The method of claim 1, wherein the values of IAS are developed specifically for the aircraft.

7. The method of claim 1, wherein receiving current measured data values includes receiving current measured data values from an air data computer (ADC) output.

8. The method of claim 1, wherein the step of receiving current measured data values includes applying a reasonableness filter by the computer to remove spurious altitude readings.

9. The method of claim 1, wherein the step of receiving current measured data values includes applying a steady-state filter by the computer to smooth out transients to determine steady-state climb and decent rates.

10. The method of claim 1, wherein the step of receiving current measured data values includes receiving pitch attitude from an inertial reference unit on the aircraft.

11. The method of claim 1, wherein the step of receiving current measured data values includes receiving engine power data from an engine controller.

12. The method of claim 11, wherein the step of receiving engine power data from an engine controller includes receiving data indicative of one or more of fan rotation speed and engine pressure ratio.

13. The method of claim 1, wherein the method is performed continuously and automatically by the computer during aircraft flight.

14. The method of claim 1, further comprising applying a smoothing filter to the expected IAS data values to avoid transient jumps that might otherwise trigger spurious alert signals.

15. A system for detecting errors in indicated air speed in an aircraft, the system comprising:
- a computer having a software module configured to receive from sensors mounted on the aircraft an input stream of current measured data values indicative of one or more of a pressure altitude, geometric altitude, vertical speed, pitch attitude, and engine power of the aircraft;
- a computer-readable storage medium having a plurality of look-up tables, the look-up tables having values of indicated air speed (IAS) corresponding to measured data values for one or more of cruise, holding, climb, descent, terminal area, and final approach, the look-up tables adapted from a quick reference handbook for the aircraft;
- the software module being configured to compute from the look-up tables and the current measured data values a current expected IAS, given the current measured data values and the values of IAS from the plurality of look-up tables; and
- the software module being configured to receive from an IAS sensor on the aircraft current data values indicative of a measured IAS of the aircraft, compare the current expected IAS data values to the current data values indicative of the measured IAS, and generate an alert signal when the expected IAS data values and the measured IAS data values differ by a pre-set amount for a pre-set time period.

16. The system of claim 15, further comprising a crew alerting system connected to receive the alert signal.

17. The system of claim 15, wherein the computer is configured to receive current measured data values from an air data computer output.

18. The system of claim 15, wherein the computer is configured to be connected to a flight crew alert system.

19. The system of claim 15, wherein the IAS sensor on the aircraft is a pitot tube on the aircraft.

20. The system of claim 15, wherein the software module is configured to filter one or more of measured data values indicative of altitude to remove spurious altitude readings from the input stream, and vertical speed to remove transients to determine steady-state climb or descent rate.

21. A method for detecting errors in indicated air speed of an aircraft, the method comprising:
- receiving from sensors mounted on the aircraft current measured data values indicative of one or more flight conditions of the aircraft by an air data computer;
- receiving from an indicated air speed (IAS) sensor on the aircraft current data values indicative of a current measured IAS of the aircraft by a second computer;
- accessing at least one look-up table stored on a computer-readable storage medium, the look-up table having values of indicated air speed (IAS) corresponding to the one or more flight conditions;
- computing on the second computer from the current measured data values and the values of indicated air speed (IAS) corresponding to the one or more flight conditions from the look-up table a current expected IAS;
- comparing the current expected IAS to the current measured IAS by the second computer; and
- generating an alert signal by the second computer when the current expected IAS and the measured IAS differ by a pre-set amount for a pre-set time period.

* * * * *